(12) United States Patent
Ritter et al.

(10) Patent No.: US 7,849,400 B2
(45) Date of Patent: Dec. 7, 2010

(54) ELECTRONIC CHARTING SYSTEM

(75) Inventors: John David Ritter, Monroeville, PA (US); Peter Julius Freymark, Allison Park, PA (US); Joseph Howard Gatewood, St. Louis, MO (US); Michael Jed Ginsburg, Pittsburgh, PA (US); John Robert Previs, Bethel Park, PA (US); Evan Indianer, Pittsburgh, PA (US); Christopher M. Umbel, Pittsburgh, PA (US)

(73) Assignee: Speech Products, Inc., Monroeville, PA (US)

( * ) Notice: Subject to any disclaimer, the term of this patent is extended or adjusted under 35 U.S.C. 154(b) by 2317 days.

(21) Appl. No.: 09/951,491

(22) Filed: Sep. 13, 2001

(65) Prior Publication Data

US 2004/0205042 A1    Oct. 14, 2004

(51) Int. Cl.
*G06F 17/00*    (2006.01)
(52) U.S. Cl. ...................... 715/234; 715/221
(58) Field of Classification Search .............. 715/513, 715/505, 221, 234; 705/3
See application file for complete search history.

(56) References Cited

U.S. PATENT DOCUMENTS

| | | | |
|---|---|---|---|
| 5,619,708 A | | 4/1997 | Ho |
| 5,664,109 A | * | 9/1997 | Johnson et al. ............... 705/2 |
| 5,668,928 A | | 9/1997 | Groner |
| 5,903,889 A | * | 5/1999 | de la Huerga et al. .......... 707/3 |
| 6,154,738 A | | 11/2000 | Call |
| 6,167,448 A | | 12/2000 | Hemphill et al. |
| 6,182,029 B1 | | 1/2001 | Friedman |
| 6,216,104 B1 | | 4/2001 | Moshfeghi et al. |
| 6,604,115 B1 | * | 8/2003 | Gary et al. ............... 707/104.1 |
| 6,775,670 B2 | * | 8/2004 | Bessette ...................... 707/10 |
| 6,820,235 B1 | * | 11/2004 | Bleicher et al. .......... 715/501.1 |
| 6,968,503 B1 | * | 11/2005 | Chang et al. ................ 715/526 |
| 2001/0051881 A1 | * | 12/2001 | Filler ............................. 705/3 |
| 2002/0161795 A1 | * | 10/2002 | O'Rourke ................... 707/500 |
| 2002/0194029 A1 | * | 12/2002 | Guan et al. ..................... 705/3 |
| 2003/0144884 A1 | * | 7/2003 | Mayaud ......................... 705/3 |
| 2003/0158754 A1 | * | 8/2003 | Elkind ............................ 705/3 |
| 2004/0199409 A1 | * | 10/2004 | Brown ........................... 705/3 |

OTHER PUBLICATIONS

Essin, Daniel, et al. "Healthcare information architecture: elements of a new paradigm", pp. 32-41, 1994, ISBN: 0-8186-6335-9.*
Fierz W, Gruffer R., The SGML Standardization Framework and the Introduction of XML Journal of Medical Internet Research 2000. 2(2):e12, www.jmir.org/2002/2/e12/.
VoiceDOC Medical, Inc., VoiceDOC Project, www.voicedoc.com/prod01.htm, May 8, 1999.

* cited by examiner

*Primary Examiner*—Rachna S Desai
(74) *Attorney, Agent, or Firm*—Buchanan Ingersoll & Rooney PC

(57)    ABSTRACT

In a document such as a patient chart that contains several types of information, a tag is applied to each type of collected information to identify the content or type of data. The information is also associated with at least one particular individual, event or other association member. The information is stored in a manner such that each type of information collected is associated with one of the assigned tags and an association member. Each user has an access code associated with at least some of the defined tags. When a user seeks to retrieve collected information, access is permitted to only that information having tags associated with the access code assigned to that user. The tags are preferably created by storing the information in XML format. A standard may be applied to information collected to determine whether the collected information corresponds to the standard.

3 Claims, 9 Drawing Sheets

Memorial Hospital Emergency Department  MedRec: 98765432
123 Main Street, Center City, PA  15151   DOS/TOS: 01-16-2001

Name: Joe Patient   Address: 10 Fifth Avenue
DOB: 12-12-1960       Center City, PA  15151
Sex: M

Insurance: OHIP   Plan #: 1234567

Chief Complaint: Abdominal pain.

History of Present Illness: Context: The patient was at home playing cards and experienced shortness of breath. Quality: Severe. Associated Signs & Symptoms: Nausea.

Post Medical History: Allergic to penicillin

Family History: Not available.

Review of Systems
  Constitutional: No appetite or weight changes.

Neurological: No headaches or seizures.

Psychiatric: Ophthalmologic: Unknown.

Cardiovascular: Chest Pain: Some. Shortness of Breath: Abated now.

Gastrointestinal: Nausea/Vomiting: Occasional nausea. Melena/Blood in Stool.

Physical Exam:
  Vitals and Appearance: Temperature: 98.0. Respiratory Rate: 22. Pulse: 110. Blood Pressure: 100/60. Distress: Moderate distress.

Neurological Exam: General: The neck is supple.

Respiratory Exam: Breath Sounds: Clear.

Cardiovascular Exam: Rate/Rhythm/Ectopy: The patient's rhythm is irregular. There is a soft apical murmur Page 1

Figure 1b

Memorial Hospital Emergency Department  MedRec: 98765432
123 Main Street, Center City, PA 15151  DOS/TOS: 01-16-2001

Name: Joe Patient  Address: 10 Fifth Avenue
DOB: 12-12-1960  Center City, PA 15151
Sex: M

Abdominal Exam: Generalized tenderness. Appendectomy scar. Normal rectal exam.

Results of Studies:

CBC: (WBC, H&H, Platelets, Diff., Indices): Hemoglobin = 8. Hematocrit = 24.

Plain Films: The patient has an enlarged heart.

Course During Exam:

1: 1.30 a.m. Differential diagnosis of abdominal aortic aneurysm. Patient and family have been notified of the need for urgent surgery. The patient has been transferred to the operating room.

Medical Decision Making:
    Specialists: Dr. Johnson

1: The ruptured triple-A.

1: Prognosis is very guarded.

Diagnoses:
    The ruptured triple-A.

Condition on Discharge or Admission:
    Admit to the operating room.

Signatures:
    Michael Ginsburg, M.D. (Electronically signed: 01-14-2001)

| DosTos | CC | Chart Owner | Modified | Provider | Dept | BillingLevel |
|---|---|---|---|---|---|---|
| 3/27 1:30 | Wound | Dr. Doe | 3/27/01 | AGH | ICU | 5 |
| 3/28 2:20 | Wound | Dr. Doe | 3/28/01 | AGH | ED | 2 |
| 3/29 6:21 | Fracture | Dr. Doe | 3/29/01 | UPMC | ICU | 5 |

Patient History — Active Charts (Open Chart / Create Chart)

Figure 9

ELECTRONIC CHARTING SYSTEM

FIELD OF INVENTION

The invention relates to a method and system for collecting, storing and accessing information, particularly medical information.

BACKGROUND OF INVENTION

Healthcare providers maintain records for each of the patients that they see. One of the most commonly maintained record is the patient chart. That chart contains information that identifies the patient, often called ADT information. The ADT information may include name, address, age, sex, social security number, patient number, insurer and primary care physician. The patient chart may also be a medical history based upon answers given to the caregiver by the patient as well as on past treatments. In addition to the ADT information there are entries made by the caregiver to record each examination of the patient. These entries include the date of the exam as well as entries concerning symptoms or complaints that the patient reports to the caregiver, observations made by the caregiver, diagnosis, and prescribed treatment. Each report of examination must be signed by the report's author or authors.

The United States Government's Department of Health and Human Services Health Care Financing Administration (HCFA) agency defines guidelines by which reimbursement is made for various levels of service that caregivers provide to patients. The Resource-Based Relative-Value Scale (RBRVS) is a statistically derived measurement scale, developed for HCFA, which assigns relative reimbursement-related values to various medical-practitioner services. Reimbursement values are enumerated as Level-I through Level-V, with Level-I depicting the least complex level of service and Level-V depicting the most complex level of service. The level of complexity is determined from the information entered on the patient chart. The following table depicts one method by which RBRVS billing levels I-V are determined from a patient-chart. The first column lists the categories of information on the chart. For a simple procedure the physician has looked at only two of the patient's systems and examined only two parts of the patient's body. A complex procedure involved a review of 10 systems and 9 body parts as well as obtaining a more detailed patient history.

| CATEGORIES | SIMPLE | COMPLEX |
| --- | --- | --- |
| Chief Complaint | 1 | 1 |
| History of Present Illness | 3 elements | 4 elements |
| Past Medical History | 1 element | 1 element |
| Social History | 0 | 1 (or 0, if 1 Family History) |
| Family History | 0 | 1 (or 0, if 1 Social History) |
| Review of Systems | 2 systems | 10 systems |
| Physical Examination | 2 parts | 9 parts |
| Course | 0 | 1 |
| Medical Decision Making | 0 | 1 |
| Impression | 1 | 1 |
| Disposition | 1 | 1 |

In many hospitals the patient charts are reviewed by coders who translate the information on the chart to codes used by the patient's insurer to determine the amount of payment that will be made by the insurer for the service rendered by the hospital. It is not uncommon for an insurer to refuse payment or consider what the doctor believed was a more complex treatment to be a simple treatment. The difference of opinion often results from the fact that the doctor had not entered onto the patient chart sufficient information for the insurer to regard the treatment as more complex. Had the physician realized that more information was required he or she could have entered that information on the chart at the time of the patient examination. Another problem can occur when the coder does not properly interpret an entry on a chart, and therefore codes that entry incorrectly. This may occur if the coder misreads the handwriting on the chart or misinterprets the phraseology used by the physician. One solution to this problem is for the physician to use standard phrases or codes for the procedures that are used. Yet, that solution places a burden on the caregiver to remember or lookup the codes or standard phrases.

A number of medical language processing systems have been developed that structure and/or encode information occurring in textual clinical reports so that the information can be used for automated decision support and for facilitating document manipulation and viewing by the user. For, example, Friedman in U.S. Pat. No. 6,182,029 discloses a system and method that parses text in a patient chart in accordance with certain parameters and then generates a structured output that is more reliable and may include codes as well as standard phrases. While these systems can be useful, they all operate after the entries in the document have been completed and the patient has been discharged.

Healthcare is to a large extent an information-processing activity. Data about a patient's physical condition is collected by the treating physician using various diagnostic techniques, and is evaluated within the framework of his or her medical knowledge to reach the appropriate decision for therapeutic measures or further diagnostic procedures. If this information processing path is to be effectively enhanced by electronic decision support systems, it is inevitable that data will be structured at some time point, ideally at the very moment of data collection. For this structuring to be useful, however, it requires a standard syntax and terminology that is used by all participating healthcare providers. The lack of such a commonly agreed-upon electronic language has so far been a major impediment for rapid development in this field. Health Level 7 (HL7) was founded in 1987 to develop standards for the electronic interchange of clinical, financial, and administrative information among independent healthcare oriented computer systems; e.g., hospital information systems, clinical laboratory systems, enterprise systems, and pharmacy systems. In August 1996, the HL7 Technical Steering Committee authorized the creation of a Standard Generalized Markup Language (SGML) Special Interest Group as part of a larger initiative to integrate SGML into medical informatics standards. "HCML" is a proposed abbreviation for the evolving markup language: "Health Care Markup Language."

One application of SGML, Hypertext Markup Language (HTML), has revolutionized the world wide web in the way that electronic documents are exchanged. But, another SGML, Extensible Markup Language (XML), is being viewed as better suited to patient records and their storage, retrieval and exchange. This is so because XML provides tags that identify the content of a document independent of document format. Furthermore, the text is both machine readable and capable of being easily read by people. An example of a tagging scheme for an address would read as follows:

```
<address> <street> <number> 102 </number> <street_name> Fifth Avenue
</street_name> </street> <city> New York </city> <state> NY </state> <zipcode>
10001 </zipcode> </address>
```

The art has recognized that a document prepared in XML format can be displayed in any of a variety of ways using a program that instructs the computer to look for the tags and then place information within the tags into a specific location on a page and in a particular font and style. As a result XML has been used to identify healthcare documents and even used to identify information within those documents.

Another trend that has been occurring in the healthcare industry is the use of speech recognition software to create patient records. Speech recognition is the field of computer science that deals with designing computer systems that can recognize spoken words. These words are then recorded as text that can be edited, stored or transferred like any text document. Some systems contain features that not only translate spoken words into text, but also use selected words to cause a computer to perform certain actions. For example, saying the word "edit" may cause the speech recognition software to stop recording and translating spoken words while the user reviews and edits the text that has been created. Manufacturers of speech recognition software have made their products available for use in products made by others. Some of those products take the output of the speech recognition engine and arrange the text to create specific documents. Speech recognition systems have been used to create patient charts. However, the charts that have been created using speech recognition are simply text documents.

Yet, another development in the healthcare industry has been the creation of government regulations that restrict access to patient information. Some information that may appear on a patient's chart cannot even be made available to insurers and other third party payers, but those individuals are permitted to see other information on that chart. Consequently, even though the creation of electronic patient charts facilitates transfer of patient information, government regulations restrict access to that information. As a result, there is a need for an electronic charting system that facilitates transfer of information but contains controls that restrict such information to only those entitled to receive it. There is also a need for an electronic system that permits access to information on a patient chart selectively, allowing different people to access different information on the same chart.

The need for a charting system that facilitates collection and transfer of information while controlling access to collected information is not limited to the healthcare field. Legal documents such as contracts may contain both a performance requirements section and a financial details section. Certain employees may have a need to know information in one or the other section, but not both sections. Manufacturing specifications may contain the basic configuration and general composition of a product that can be disclosed to a potential customer as well as tolerances and formulations that the manufacturer does not wish to disclose. Such documents may contain information useful to a distributor but is inappropriate for disclosure to customers or potential customers. There is much interest and activity among manufacturers to post documents on a server for access by customers, distributors and the general public. Many times a manufacturer will create two or three separate versions of the same document, one version containing information not in another version, for example, a distributor version and a customer version. There is a need for a document-creation system that would enable the creator to restrict access to some information in the document to some users while allowing other users to access the entire document.

There is also a need for a document-creation system that checks the document or chart to assure that sufficient information has been entered according to a predetermined standard. Such a system should report to the user collecting the information whether or not the standard has been met at the time the information is entered into the system. Since information normally is entered in a patient chart before the patient is discharged, missing information can be readily obtained and entered into the patient chart.

SUMMARY OF THE INVENTION

We provide a system and method for recording and retrieving information in electronic form such as a patient chart that contains several types of information. When the information is collected, a tag is applied to each type of collected information to identify the content or type of data. The information is also associated with at least one particular individual, event or other subject. Those persons, events or other subjects are called association members. The information is stored in a manner such that each type of information collected is associated with the assigned tags and the assigned association member or members. Users are issued access codes or passwords. Each access code is associated with at least some of the defined tags. When the users seeks to retrieve collected information, the system and method permit access to only that information having tags associated with the access code assigned to that user. The tags are preferably created by storing the information in XML format.

We further provide at least one qualification standard. One type of qualification standard contains a list of tagged information required to be associated with a single association member. For example, the standard may require that a patient's blood pressure and temperature be entered whenever patient information is added to the chart. The standard is applied to information collected to determine whether the collected information corresponds to the list of tagged information required by the standard. If not, the system advises the one collecting the information that the standard has not been met. The system may further identify the type of information that is missing or simply inform the user that the information does not meet the standard.

Other objects and advantages of our system and method will become apparent from the preferred embodiments shown in the drawings.

BRIEF DESCRIPTION OF THE FIGURES

FIGS. 1a and 1b show a layout of a typical patient chart.

FIG. 9 is a layout of a patient chart history screen display.

DESCRIPTION OF THE PREFERRED EMBODIMENTS

Figure 2:
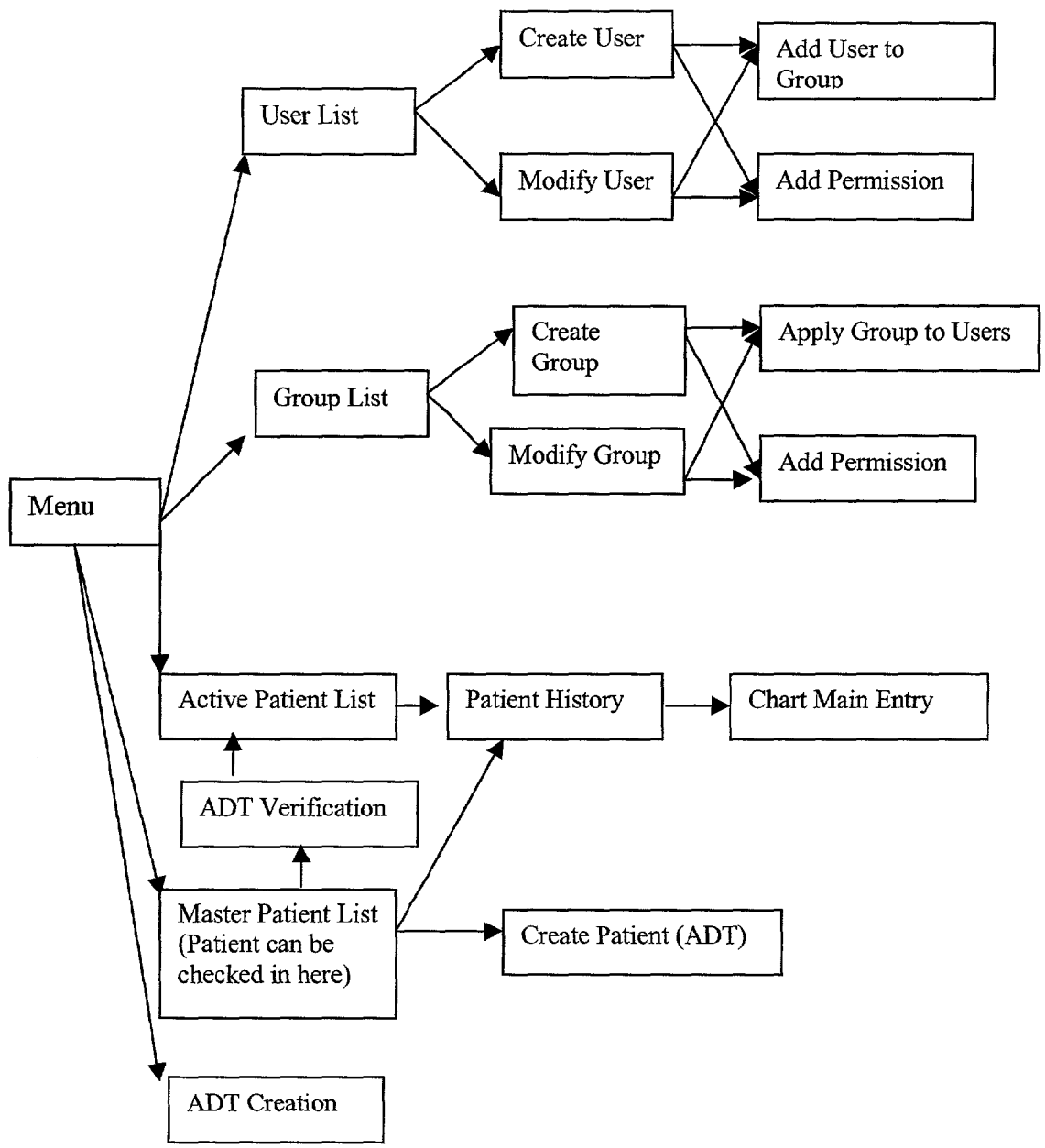
FIG. 2 is a flow chart of functional unit flow for a present preferred embodiment of our system.
Figure 3:
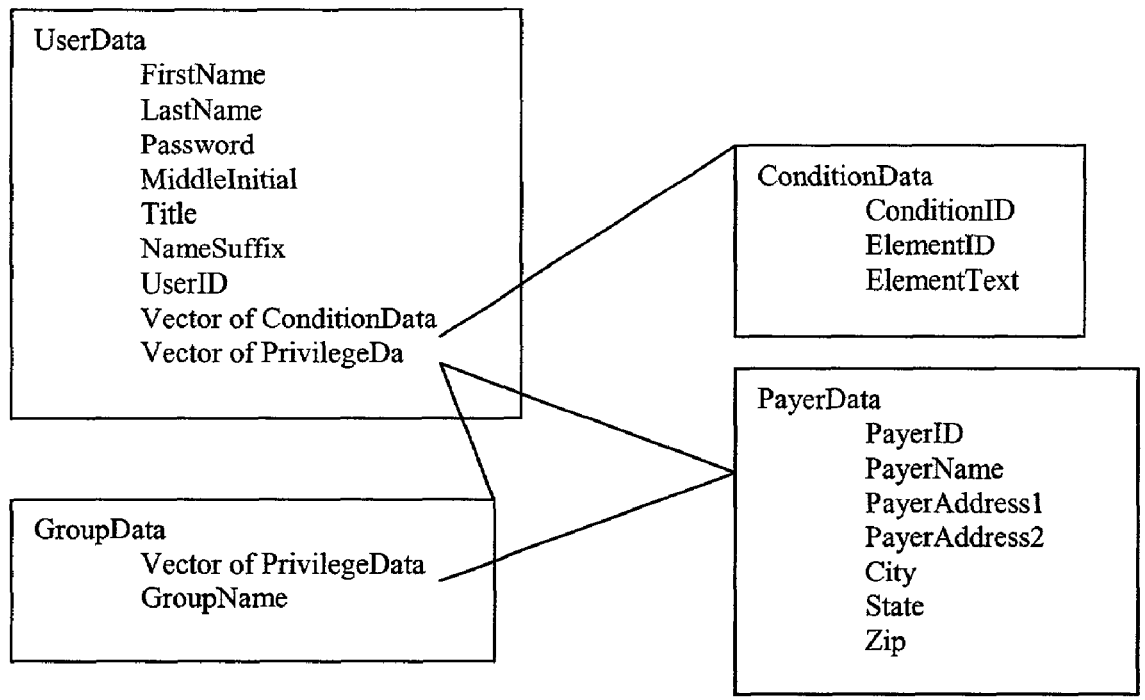
FIG. 3 is a data structure relational diagram for user and authentication data.

Patient charts are now being kept in both paper and electronic formats. A typical patient chart shown in FIGS. 1a and 1b corresponds to paper patient charts and electronic patient charts now in use. Information in the chart is for a hypothetical patient. Only some of the patient information that would appear on a typical chart is contained in FIGS. 1a and 1b. The chart contains a chart header section, a patient history section, a patient examination and treatment section, diagnosis, condition on discharge or admission and a chart signature block. The chart header section typically contains the name and location of the service provider including the institution name and department, patient name, address, birth date, gender and medical record number and date and time of service. A patient identification number such as a number assigned by the provider or a patient's social security number may also be present. The patient's insurance carrier may also be identified by name or number in the chart header and the plan name or number may also be listed. The chart also contains medical history information, a review of patient systems, information obtained by physical exam, results of tests, course taken during exam, medical decision making, diagnosis, condition on discharge or admission and signatures.

The patient chart of the present system includes the same type of information as is present in most paper and electronic patient charts. Our chart also preferably includes a billing level goal and billing level obtained for the patient. The billing level goal is assigned by the healthcare provider based upon the patient's condition. The goal may be a value from I to V corresponding to the RBRVS scale or categories simple, moderate and complex. Each category corresponds to a set of elements or steps that must be performed by the physician or other caregiver. Consequently, when a billing level goal is selected, there will be certain steps that must be done to reach that billing level. Our system tabulates the steps performed by the physician as they are entered into the patient chart and matches them against the billing level goal. We prefer to provide on the chart a tabulation of elements completed and the corresponding billing level obtained. In the RBRVS table discussed earlier, a simple procedure may contain 11 elements and a complex procedure may have 31 elements. If the physician has performed 20 elements but set a billing level goal of complex, our system would tell the physician that 11 more elements are needed to reach the billing level and that the elements entered result in a billing level for a simple procedure. We further provide a prompt in the data entry portions of the chart to indicate the types of information required to reach the complex level. In many instances the physician will have provided the services required to meet the complex level but had not yet entered the necessary information to meet that level. The system will prompt him or her to enter that information. Should further examination or tests of the patient be needed, that work can be promptly performed. Standard medical practice is to complete the patient chart of one patient before discharging that patient and usually before seeing a second patient. Consequently, it is easy for the caregiver to complete the additional work when informed that elements must yet be entered onto the chart.

The user data on a patient chart identifies the caregiver who has examined the patient and who is required to sign the chart. In an electronic charting system, a user gains access to a chart by first logging into the system. During the log-in procedure the user enters a password or access code unique to that user. The system contains the name, title and user identification number associated with each valid password or access code. Consequently, the system can easily enter user information into the patient chart when the user opens the chart or when the user seeks to enter data into the chart.

Standard medical procedure requires that a healthcare provider sign a patient chart when the chart has been completed. Digital signatures are commonly used for electronic documents. We require the caregiver sign the chart with a digital signature when finished adding information to the chart. In our system a caregiver can edit the patient chart at any time between opening the chart and electronically signing the chart. If a caregiver wishes to change an entry after signing the chart, the change must appear as a new entry on the chart in a chart addendum.

The patient history portion of the chart can be imported from another record of the patient or completed by the caregiver. We prefer that the data be imported from the most recently completed chart. Typically, patient histories are developed from answers to a set of questions that may be standard for all patients or standard for particular types of patients. Our system is capable of presenting those questions and developing a patient history from the answers. We also prefer to provide an open field in which text can be entered.

The examination and treatment section of the chart is an open field in which the physician enters observations and test results. Many physical conditions are regarded as normal when a set of other conditions are present or within certain ranges. Rather than require the physician to enter all conditions that correspond to normal we prefer to provide a set of descriptions that correspond to certain conditions. These conditions are associated with age group and sex of the patient. Consequently, entry of "normal" would result in the description corresponding to "normal" appearing on the chart. Our system further enables the physician to create custom descriptions or entries. These custom descriptions are associated with an identifier and the physician who created them. The identifier could be a number, a word or a phrase. To cause the description to be entered on a chart, the physician enters the identifiers for that description. In our system we identify these custom descriptions as "Reusable Work In Progress" or "Reusable WIP." The Reusable WIP is not limited to a single paragraph. Indeed, the Reusable WIP could be a partially completed patient chart having all the entries that correspond to a particular chief complaint or patient condition.

We further prefer to provide a speech recognition module as part of our system. The system translates the words spoken by the user into a data stream corresponding to text. Our system enters the text into the appropriate field on the chart and may recognize certain words or phrases as associated with a stored description and insert that description into the chart. The system may also be configured to recognize certain words or phrases as commands and respond to those commands. Several commercially available speech recognition products can be used in our system. We prefer to use a speech recognition system offered by IBM under the trademark "ViaVoice."

When information is entered into a present preferred embodiment of our system the system stores the information in XML format. Consequently, the information entered into each field on the chart has a tag that identifies and tells what meaning is attached to the information. By tagging the information, it is easy to access information in any field. More importantly, we are also available to provide selective access to information and to transmit selected information over a network (including the Internet). Although we presently prefer to use XML, other mark-up languages, such as HCML or XHTML as well as mark-up languages yet to be developed, that tag content in a way that gives special meaning to selected content could be used. For embodiments involving patient charts and other medical records, the system should meet all standards adopted by the HL7 Committee.

A systems administrator with full privileges can define any number of custom user groups. The administrator can assign privileges to a user such as the ability to create a patient chart, modify a patient chart or modify ADT information.

A typical system will have users who can both enter and access information and other users who can only access information. Users who can both enter and access information in a patient chart are the physicians, nurses, physicians assistant's, therapists and other caregivers who are responsible for examining or treating patients. An admissions clerk may be among the users who can both enter and access patient chart information. Those users who can only access information on a patient chart are primarily administrators and coders who prepare invoices for services rendered and payers, typically insurance companies who pay for the services. Furthermore, at least some of those access-only users are not able to access all information on a patient chart.

A flow diagram for a present preferred embodiment of our electronic charting system for creating patient charts is shown in FIG. 2 and illustrates the basic operation of the system. When a user logs into the system and enters his or her password, a menu will appear and the voice model for that user will load to the local machine if appropriate. That menu can offer five options. However, a user will be shown only those options that he or she is permitted to use. For example, a nurse who is not permitted to create users or user groups would not see those options on the menu presented to that nurse. The first option, identified by the box ADT Creation, enables the user to enter patient identification information. This option will be most frequently used by a nurse or admissions clerk who sets up patient charts for new patients whose names are not in the system. When this operation is selected, a screen appears having fields for a patient's name, address, telephone number, birth date, patient identification number (perhaps social security number), sex and insurance carrier. This step may also include entry of the patient's primary care provider and reason for visit. The reason for visit may be one or more of the symptoms or "Chief Complaints" of the patient. We further prefer that the system automatically date stamp each event with a date of service and time of service (DosTos). DosTos can be determined automatically from the system clock. After the required information has been entered, the system adds the patient information to a master patient list.

A second menu option is the Master Patient List. If the user believes that the system contains patient information for a particular individual the user can look for the patient's name in the master patient list. If the patient is found on the master patient list, the user verifies the patient ADT information. Patients on the master patient list may be classified as inactive, meaning that they are not receiving treatment for an ongoing illness or have not had data entered for a selected time period, or they may be active. If the patient is not on the active patient list the user can add that patient to the active patient list. The active patient list will contain a link to the patient's charts. The user also has the option of navigating from the master patient list to the patient history and then to the patient's chart, identified as Chart Main Entry in FIG. 2. An example Patient History screen listing active charts for a selected patient is shown in FIG. 9. The patient history screen displays ADT information about the patient, as well as a chronological history of medical charts that can be selected for viewing. From this screen a user may open one of the listed charts or create a new chart. If the user does not find the patient on the master patient list he or she may add the patient to the system by entering patient information. This addition is indicated by the block Create Patient (ADT) in FIG. 2. Most users will access a patient record through the Master Patient List or the Active Patient List.

Two other options on the menu are the User List and the Group List. These options are selected to add users or groups of users to the system or to modify information relating to them. We envision that users of the system will be grouped according to the permission or privileges that the user has in the system. One group of users may be physicians who all are able to access and enter all patient information. Consequently, it is possible to create a group and specify permissions given to all members of that group. When a user is added to the system, the Create User step involves entry of the user name, title, signature, password and possibly other information about or unique to the user. After that information is entered, the system enables the user to be included in a user group, thereby receiving all privileges available to members of that group. Alternatively, one could assign privileges to that user without putting the user in a group. The system also permits modification of user or group information as indicated by the blocks Modify User and Modify Group. When a group is created or modified, the steps would involve associating users to a group, adding or removing permission or both. For systems that utilize speech recognition for data entry, the step of creating a user would involve loading a user's current voice model and saving that model. Typically, this will be done by requiring the user to read certain text contained in the voice recognition module. The user may also be associated with a particular point of care location.

Some speech recognition systems require that the speaker speak slowly and distinctly and separate each word with a short pause. These systems are called discrete speech systems. Recently, great strides have been made in continuous speech systems—speech recognition systems that allow you to speak naturally. There are now several continuous-speech systems available for personal computers. Most of these systems require a training session during which the computer system becomes accustomed to a particular voice and accent. Such systems are said to be speaker dependent. Other speech recognition systems that purport to recognize words spoken by all speakers and require no training session are said to be speaker independent. At this time we have determined that a speaker-independent voice engine does not provide sufficient accuracy to enable its use with our electronic charting system. Therefore, until a more accurate speaker-independent speech system is developed a speaker-dependent engine should be used. Because we are utilizing a speaker-dependent engine at this time, we transmit a user's voice model to his local machine in order that the user's voice model can "travel" with him.

Figure 7:
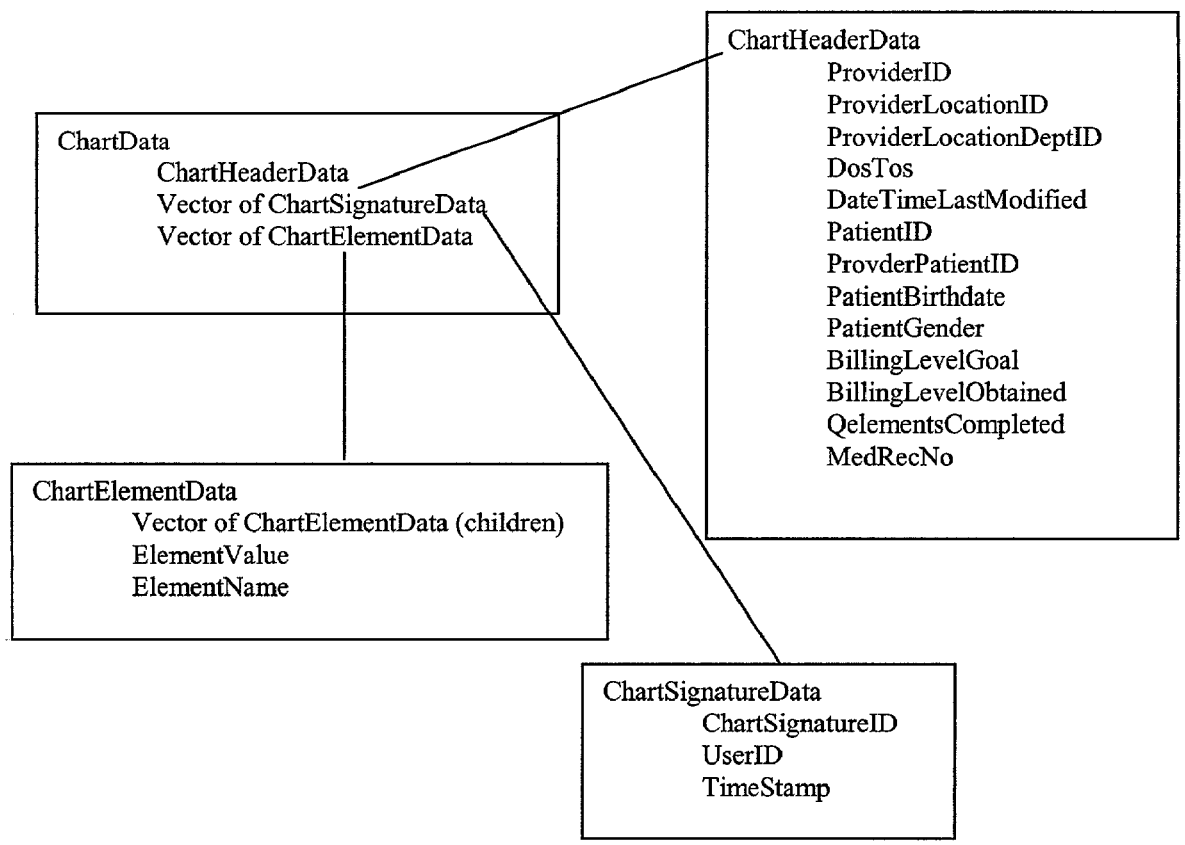
FIG. 7 is a data structure relational diagram for chart data.

The data concerning providers such as hospitals, patient charts, users, patient complaints, and payers are contained in sets of tables that are related by vectors and identifiers. The information contained in these tables and their relationships in a present preferred embodiment of our system are shown in FIGS. 3 through 7. The content and relationships of the sets of tables should be clear from the figures. FIG. 7 reveals that a patient chart has three basic sections: the header (called ChartHeaderData), the signature block and data elements. The header contains provider and patient identification and related information. The data elements typically are information that is recorded when a patient is seen by a caregiver. Data entered during such examinations are called ChartElementData. Each element has a name and value and usually relationships to other chart elements. These related elements are identified as "children".

Figure 4:
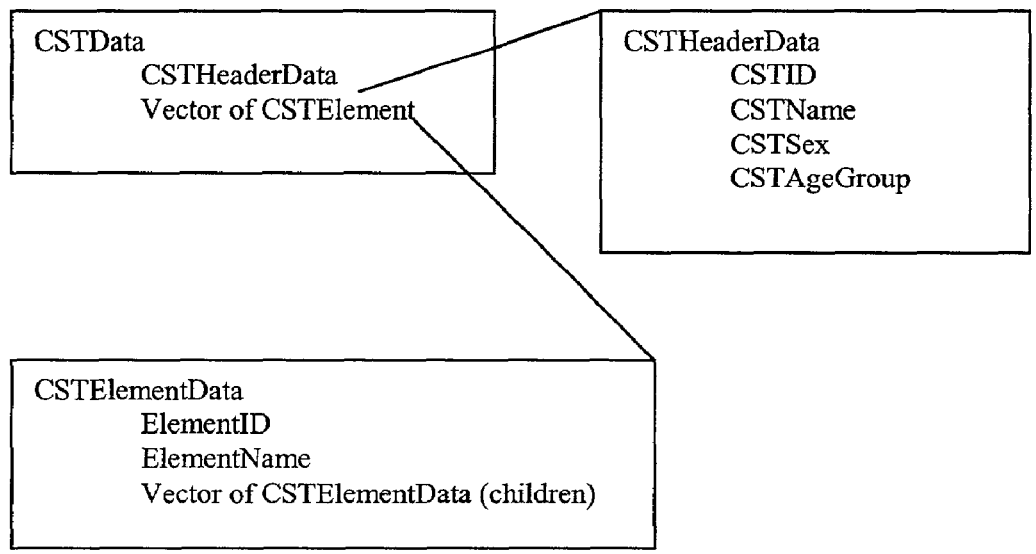
FIG. 4 is a data structure relational diagram for complaint specific template data.
Figure 5:
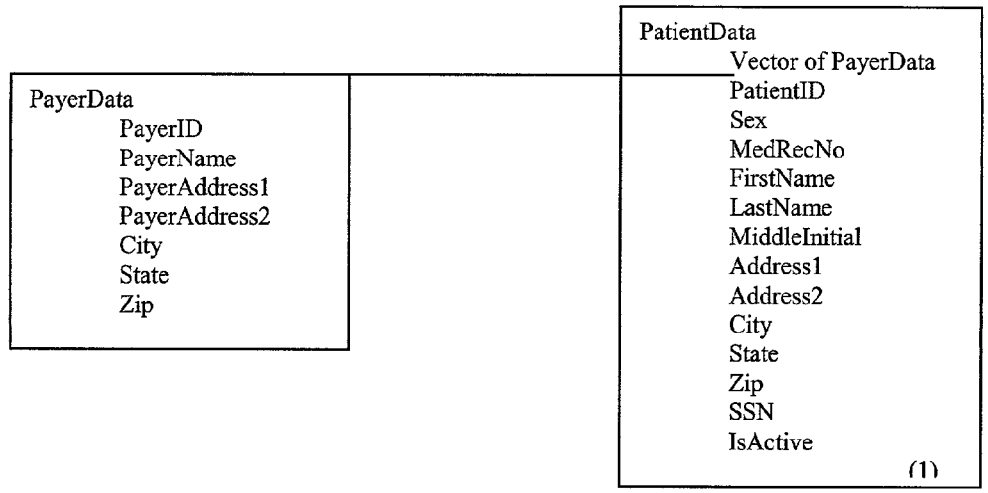
FIG. 5 is a data structure relational diagram for patient and insurance data.
Figure 6:
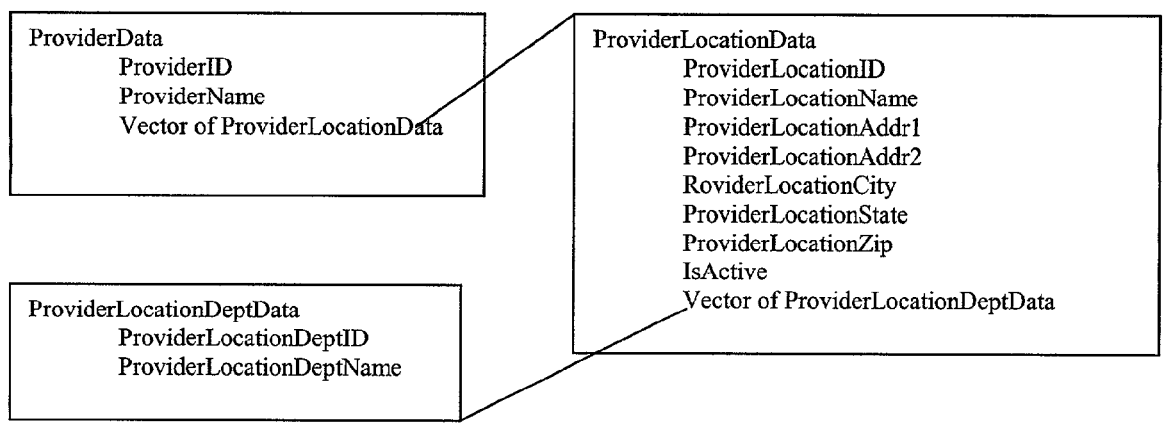
FIG. 6 is a data structure relational diagram for provider data.

We also prefer to provide a set of complaint specific templates (CST) as indicated in FIG. 4. Each template shows the chart elements for a specific chief complaint. For example, if a patient were being seen for a sore throat, the template will list other conditions that frequently accompany a sore throat such as fever and swollen glands. The caregiver reviews the list and then enters "Negative" to any elements that are not present. A single action such as a button click may facilitate the entry of a "Negative" response. If a patient has more than one chief complaint, a user may select all such chief complaints. Then a union of all appropriate CST's would be presented to the user. It is important to note that a CST is specific to age and sex of the patient.

We further prefer to enable certain users to create their own set of templates. These may be essentially collections of pre-filled chart elements relating to a specific chief complaint. Typically, each of these templates would be associated with several users or a user group. If a user prefers to describe certain conditions in a particular way or in a particular order different from the standard approach contained in the system, the user is free to create his or her own template containing the desired language or order. Those users who create custom templates are provided an interface to add, modify or remove their custom templates.

Figure 8:
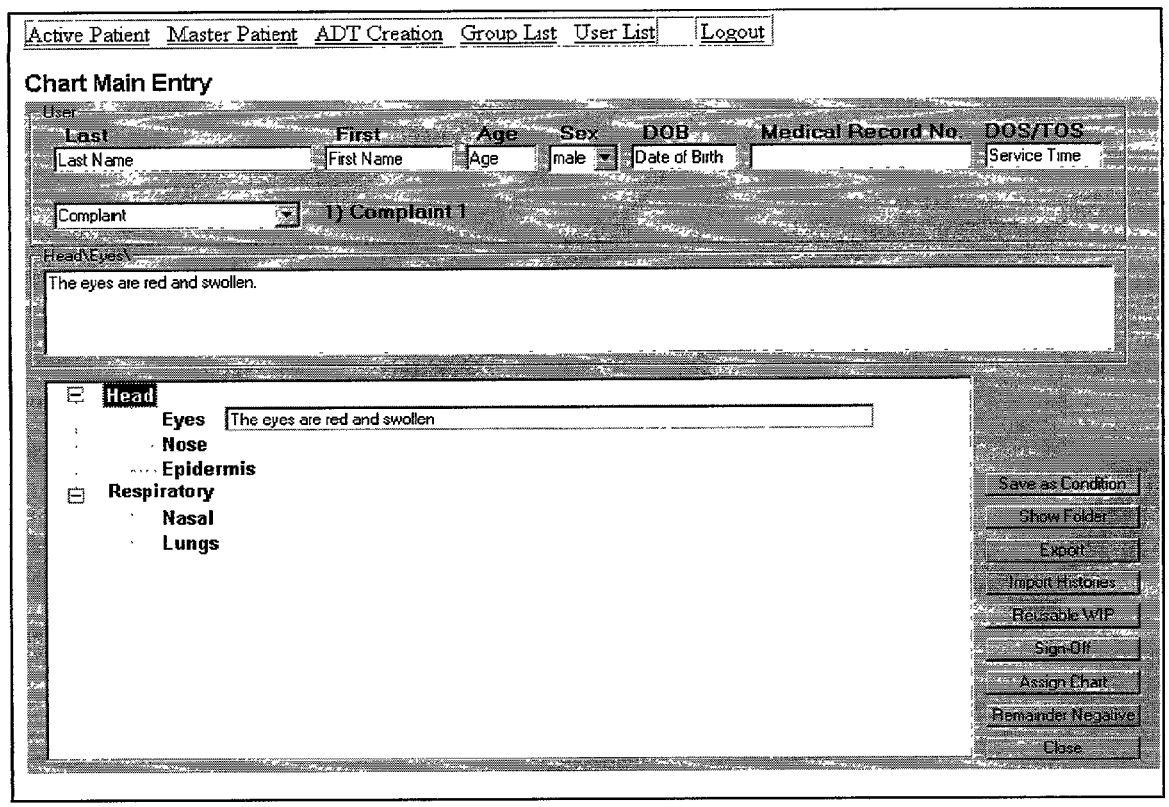
FIG. 8 is a layout of a screen display of a portion of a patient chart in a present preferred embodiment of our system.

When a caregiver sees a patient, he or she will access the patient's chart. The user then sees a display similar to FIG. 8. Then the user selects a complaint from the menu of complaints based upon information from the patient. The user also has the opportunity to select from standard templates as well as any of the custom templates that are available to that user. That selection causes a complaint specific template to appear. The template may include observations, tests, treatment, diagnosis and prescribed treatment. The caregiver then completes the template. The information in a single template may be too large to appear on a single screen display. In that event, the information is preferably presented sequentially. Another feature of our system is the ability for the user to mark only those conditions listed in a template that are present in the patient being examined and then have the system mark all unmarked conditions as negative. This is done by pressing the "Remainder Negative" button. We prefer to provide an open or blank template that enables the caregiver to enter information in the user's own words. We prefer to display several other options that are available to the creator of a patient chart. At the top of the screen there are links to the basic menu functions previously described and shown in FIG. 2. In the lower right of the screen there are links that enable the user to save a data entry as a condition and to export that information to another chart or record. The system also permits the user to import patient histories from other records. The user may also import a previously created, almost complete chart—a Work in Progress—using the link Reusable WIP. By selecting the Sign-Off link the user will call up the signature block and can then digitally sign the chart. The system also permits the user to assign the chart to another qualified user. This assignment is done by selecting the Assign User button and completing the screen that appears asking for the identity of the user to which the chart is to be assigned.

After the user has entered the desired data the user selects Sign-Off which brings up a sign-off or signature block enabling the user to sign the chart. The Close button enables the user to close the chart and brings the user to the previous screen. A user is able to come back later to a chart that has been closed, but not signed off. We prefer that the system automatically save information as it is entered. Therefore, it is not necessary to provide a "save" button for the user.

For some users we prefer to provide the ability of that user to assign the chart. That will enable other users to enter information into the chart after the chart has been opened but before it is signed off. However, only one user is permitted to enter information in a given chart at any point in time. The system associates the information entered with the user who has opened the chart until the chart is signed-off or assigned to another user.

We further prefer to provide a series of links among information in a patient chart. Consequently, a user who has opened a chart can quickly display linked information. One link is to other charts for the same patient that may be in the system. The "Show Folder" button calls up a list of other folders for the patient and allows the user to select and display the contents of any of those folders.

After the user selects the sign-off option, the system compares the information entered by the user with selected standards. These standards may relate to billing level or any other relationship. For example, the system may look to see if the diagnosis is consistent with the observations, or whether prescribed medication is likely to interact with other medication taken by the patient. If the standard is not met, the system notifies the user. Preferably, the system also identifies any missing information or other errors. The user can then correct the errors and insert any missing information. The system may require the user to correct the errors or supply missing information before permitting the user to sign off the chart. For applications other than patients charts the system may not allow the user to enter information on other electronic documents until the error has been corrected. It is common for physicians to make a chart entry at one point in time, administer some treatment and then observe the effects of that treatment several minutes or over an hour later. When they make the second observation they may make a second chart entry. During the time between the first chart entry and the second chart entry the physicians will see other patients. Therefore, the physician must be able to enter information in one patient chart while other patient charts remain open.

An important feature of our electronic charting system is the ability to compare data entered into a patient chart with rules or standards of third party payers. When a caregiver has completed a chart, the system compares those entries to the standard and reports to the user whether the information meets the standard. This comparison enables the user to avoid problems in obtaining payment from the third party payer.

All of the data entered into the system is tagged using XML or other mark-up language that tells what kind of meaning to attach to the information. Consequently, we are able to limit access to information by user. For example, a payer may need to know that a blood test was performed on a particular date but need not know or be legally precluded from knowing the results of that test. A physician, on the other hand, would need to know the test results. Therefore, the system would allow the physician to access the test results but not allow the payer access to that information.

The ability to discriminate among users in making patient information available is particularly important in the medical context. Privacy laws and regulations forbid caregivers from disclosing information on a patient's chart about certain medical conditions. Because our system tags information on the chart the system can reliably protect patient privacy while permitting, billers, administrators, coders and payers to access information that they need among information on a patient chart. That is so because only the information that a user is entitled to see is accessible to that user. If the patient information is contained in a server that is accessed from remote terminals, the only information transferred to the terminal is that information a user is permitted to see. Such information is transmitted in a secure manner with the intention of meeting or exceeding any privacy laws or regulations that may apply, such as regulations issued under HCFA. Yet, no change need be made in the manner in which the physician collects information or enters the information onto a patient chart.

Figure 10:
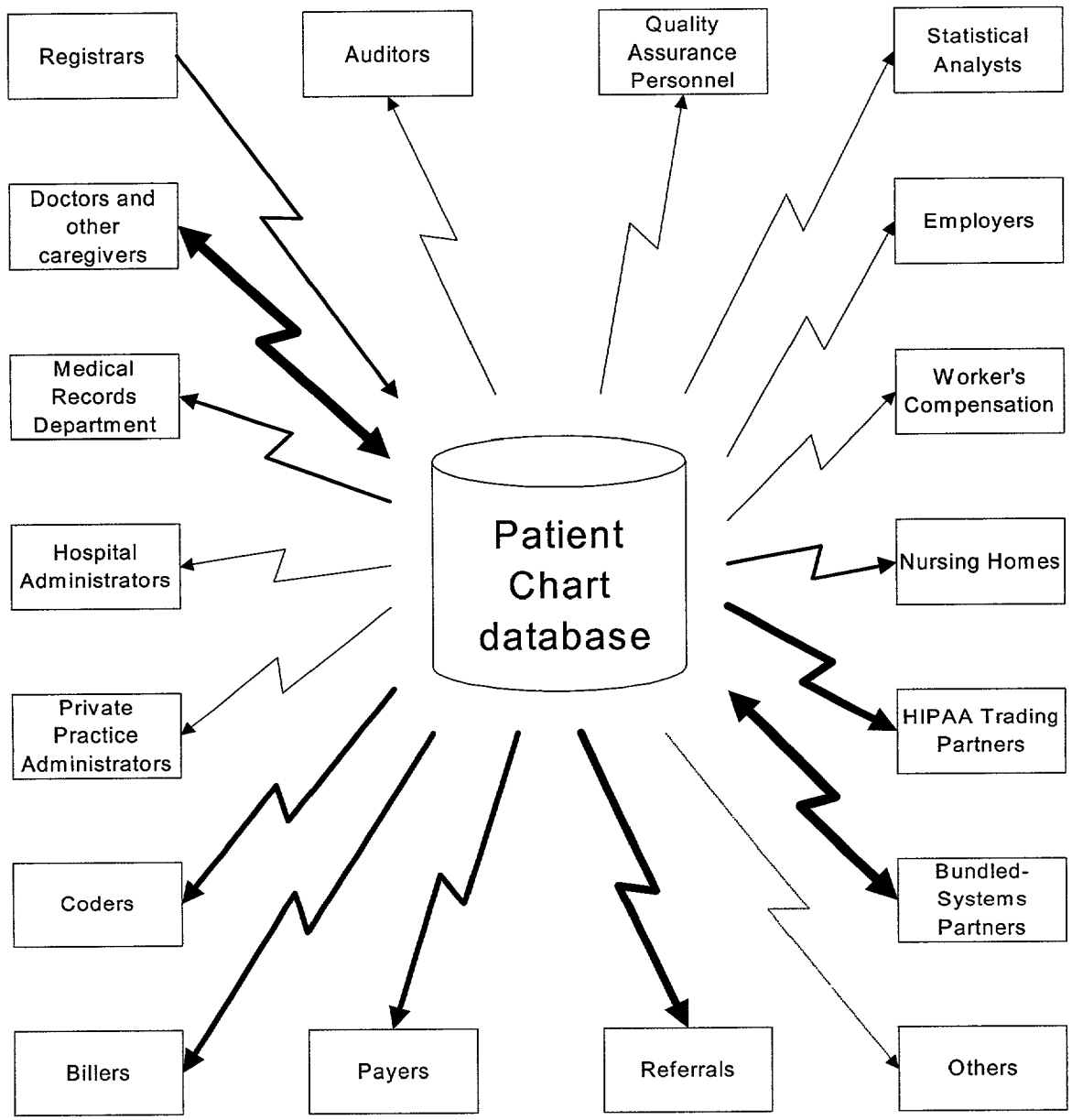
FIG. 10 is a diagram of an embodiment of our system having a central database accessed over a network.

Our system also makes it practical for the creation of a central repository or database containing all information about a patient that could be accessed by a variety of users for different purposes. Such a system is illustrated in the diagram of FIG. 10. There is a central database at a single location that contains all patient data. Several stations are connected to the database either through a direct line or over a global communications network such as the World Wide Web. As patient information is collected it is transmitted in XML format to the database. Various users identified in FIG. 10, such as doctors, hospital administrators and payers, have access to the database. However, the privileges of each of these types of users to enter information are different. Doctors may enter and view more information than can hospital administrators and payers. Administrators can enter some information and view some information. Payers may only view a limited amount of information. To indicate the difference in privileges the lines linking these users to the database are progressively thinner. Arrowheads indicate direction of information flow. Each user is assigned privileges that permit access to only that information which the user is entitled to receive. Other information would never be released from the database to the user. We prefer that encryption be used in transmitting the data to further ensure that information is received by only those entitled to receive that information. It should be understood that an actual system could have many more users than are shown in FIG. 10 and that such users are not limited to those identified in the diagram.

We envision that certain parties may already have in place systems for electronically transferring patient-related data among themselves and the healthcare provider. The present patient charting system could be bundled with those third party systems. In FIG. 10 those third parties are identified as HIPAA Trading Partners and Bundled-System Partners.

Even though we have described our charting system in the context of patient charts, our electronic charting system is not limited to the healthcare field. This system could be used for any document or record that contains information that is to be selectively accessed by users and where there is a desire to provide different levels of access to information contained on the document. Such documents could be legal documents, including billing records that may be reviewed by third party payers and contain privileged information. Manufacturing specifications may contain the basic configuration and general composition of a product that are readily apparent from an inspection of the product, as well as tolerances and formulations that are trade secrets. Such specifications could be stored in our system. The system would allow customers and potential customers to see only the basic information while employees or contractors responsible for making the product would have access to tolerances and other trade secret information that they need to make the product. Such a system can be particularly useful for industries in which products are designed at one location and made at another location. This is particularly true when the maker of the product is a subcontractor or one of several subcontractors. Our system enables the creator or owner of a document to restrict access to some information in the document to some users while allowing other users to access the entire document. Yet, the person who creates the document is able to do so in a manner quite similar to the way in which that user has created similar documents in the past. Consequently, little special training is required to use the system.

In our electronic patient charting system, information is associated with patients, or users of the system or both. Consequently, one can consider the patients and users to be members of a single association defined as those with whom information in the system is associated. If the system were used for other types of documents, there may be users associated with the information as well as other associated things. For example, a set of manufacturing specifications may be associated with a product or series of products. Documents containing financial information may be associated with transaction dates or type of transaction. The range of documents and association members linked to information on documents suitable for our system is very broad and not limited to the specific kinds of documents and association members disclosed herein.

It may be possible to modify existing electronic patient charts and other electronic document systems to incorporate features of the present invention. If that were done, the menus, screen display and databases probably will be different from the preferred embodiments disclosed herein. Accordingly, the present invention is not limited to the menus, screen displays and databases disclosed here.

Although we have shown certain present preferred embodiments of our electronic charting system, it should be distinctly understood that the invention is not limited thereto, but may be variously embodied within the scope of the following claims.

We claim:

1. An apparatus for recording and retrieving information in electronic form comprising at least one computer containing:
   a first set of tables having information relating to a plurality of members of an association such that there are several types of information recorded for each member of the association and each type of information is tagged in a manner that each tag tells what kind of meaning is attached to information associated with that tag;
   a second set of tables containing a list of users each user having an associated access privilege, each access privilege associated with at least one of the tags; and
   a program that enables each user access to only those types of information having tags that are associated with the access privilege of that user;
   wherein the at least one computer contains at least one standard applicable to at least some of the types of information in the first set of tables that ensures certain elements are entered into a table by a user.

2. An improved electronic patient chart system of the type having at least one computer containing a first set of tables containing patient information and a second set of tables containing a list of users, each user having an associated user identification, wherein the improvement comprises a third database and associated program that enables a user to create custom patient information entries and store those entries in the database, the program associating a user identification with each custom patient entry and enabling a user to access those entries associated with the user, modify those entries and associate those entries and modifications of those entries with at least one patient in the first set of tables.

3. The improved electronic patient system of claim 2 wherein the created custom patient information entries comprise entries that correspond to a particular chief complaint or patient condition.

* * * * *